UNITED STATES PATENT OFFICE.

STEN STURE NORDIN AND SVEN H. NORDIN, OF TACOMA, WASHINGTON.

FLOUR.

1,164,112.　　　　Specification of Letters Patent.　　Patented Dec. 14, 1915.

No Drawing.　　　Application filed March 10, 1914.　Serial No. 823,832.

*To all whom it may concern:*

Be it known that we, STEN STURE NORDIN and SVEN H. NORDIN, subjects of the King of Sweden, residing at Tacoma, in the county of Pierce and State of Washington, have invented certain new and useful Improvements in Flour, of which the following is a specification.

This invention aims to provide a health food in the nature of a flour, the article being primarily a recreative, invalid and baby-food.

The aim of the invention is to provide a food, which, while marketed in the nature of a flour, may be readily and conveniently prepared by mixing it with milk and boiling, so as to provide a palatable liquid food, containing ingredients which are readily digestible and highly efficient as a general tonic and more nourishing than most solid foods.

The food of the present invention is composed of three parts or 60 per cent. of hempseed-flour, one part or 20 per cent. of rye-flour, and one part or 20 per cent. of pure bran, these ingredients being, of course, combined and thoroughly mixed. When it is desired to prepare the food a suitable quantity thereof is mixed with a suitable quantity of fresh milk and the mixture is boiled for about twenty minutes. For an adult person, three to four ounces of the mixture is boiled with one quart of fresh milk, and the quantity of the mixture used is diminished according to age.

Having thus described our invention, what we claim as new is:

1. A health food consisting of a mixture including as ingredients hempseed-flour, rye-flour and bran, substantially as described.

2. A health food consisting of a mixture of 60 per cent. hempseed-flour, 20 per cent. rye-flour and 20 per cent. bran.

3. A health food consisting of a mixture including as ingredients hempseed-flour, rye-flour and bran in approximately the proportions specified.

In testimony whereof we affix our signatures in presence of two witnesses.

STEN STURE NORDIN.　[L. S.]
　　　SVEN H. NORDIN.　　 [L. S.]

Witnesses:
　　W. G. HEINLY,
　　S. E. TAYLOR.

Copies of this patent may be obtained for five cents each, by addressing the "Commissioner of Patents, Washington, D. C."